(12) United States Patent
Zhang

(10) Patent No.: US 11,501,123 B2
(45) Date of Patent: Nov. 15, 2022

(54) METHOD AND APPARATUS FOR ASYNCHRONOUS DATA FUSION, STORAGE MEDIUM AND ELECTRONIC DEVICE

(71) Applicant: BEIJING QINGZHOUZHIHANG INTELLIGENT TECHNOLOGY CO., LTD, Beijing (CN)

(72) Inventor: Yu Zhang, Beijing (CN)

(73) Assignee: BEIJING QINGZHOUZHIHANG INTELLIGENT TECHNOLOGY CO., LTD, Beijing (CN)

( * ) Notice: Subject to any disclaimer, the term of this patent is extended or adjusted under 35 U.S.C. 154(b) by 235 days.

(21) Appl. No.: 17/032,762

(22) Filed: Sep. 25, 2020

(65) Prior Publication Data

US 2021/0264223 A1 Aug. 26, 2021

(30) Foreign Application Priority Data

Feb. 25, 2020 (CN) .......................... 202010115720.8

(51) Int. Cl.
*G06K 9/00* (2022.01)
*G06K 9/62* (2022.01)
(Continued)

(52) U.S. Cl.
CPC ......... *G06K 9/6288* (2013.01); *G06K 9/6232* (2013.01); *G06V 20/46* (2022.01); *G06V 10/7715* (2022.01); *G06V 10/80* (2022.01)

(58) Field of Classification Search
None
See application file for complete search history.

(56) References Cited

U.S. PATENT DOCUMENTS 10,024,965 B2 * 7/2018 Nehmadi ............. G06V 20/584
10,592,805 B2 * 3/2020 Groh ........................ G06F 30/20
(Continued)

FOREIGN PATENT DOCUMENTS

WO    WO-2021051220 A1 * 3/2021

OTHER PUBLICATIONS

Hu et al., "A Soft Time Synchronization Framework for Multi-Sensors in Autonomous Localization and Navigation," 2018 IEEE/ASME International Conference on Advanced Intelligent Mechatronics (AIM), 2018, pp. 694-699, doi: 10.1109/AIM.2018.8452384. (Year: 2018).*

(Continued)

*Primary Examiner* — Feng Niu
(74) *Attorney, Agent, or Firm* — Volpe Koenig

(57) ABSTRACT

A method and an apparatus for asynchronous data fusion, a storage medium and an electronic device are provided. The method includes: obtaining current frame LiDAR data, and determining current frame LiDAR three-dimensional embeddings; determining a previous frame fused hidden state, and performing a temporal fusion process based on the previous frame fused hidden state and the current frame LiDAR three-dimensional embeddings to generate a current frame temporary hidden state and a current frame output result; and obtaining current frame camera data, determining current frame camera three-dimensional embeddings, and generating a current frame fused hidden state based on the current frame camera three-dimensional embeddings and the current frame temporary hidden state. Asynchronous fusion is performed on the current frame LiDAR data and previous frame camera data, which leads to a low processing latency.

11 Claims, 3 Drawing Sheets

(51) Int. Cl.
*G06V 20/40* (2022.01)
*G06V 10/77* (2022.01)
*G06V 10/80* (2022.01)

(56) References Cited

U.S. PATENT DOCUMENTS

| | | | | |
|---|---|---|---|---|
| 10,733,464 | B2* | 8/2020 | Kauffmann | G06V 20/56 |
| 10,762,673 | B2* | 9/2020 | Luo | G01S 5/16 |
| 10,809,380 | B2* | 10/2020 | Pacala | H04N 5/2353 |
| 11,094,112 | B2* | 8/2021 | Xu | G01S 17/931 |
| 11,226,413 | B2* | 1/2022 | Nehmadi | G01C 3/08 |
| 11,367,217 | B2* | 6/2022 | Shu | G06K 9/6274 |
| 2014/0368615 | A1* | 12/2014 | van Baar | G01S 17/894 |
| | | | | 382/154 |
| 2015/0310281 | A1* | 10/2015 | Zhu | G05D 1/0246 |
| | | | | 382/104 |
| 2016/0292905 | A1* | 10/2016 | Nehmadi | G06V 20/584 |
| 2018/0060725 | A1* | 3/2018 | Groh | G06N 3/08 |
| 2019/0066344 | A1* | 2/2019 | Luo | G01C 21/32 |
| 2019/0318178 | A1* | 10/2019 | Kauffmann | G06V 20/56 |
| 2020/0082554 | A1* | 3/2020 | Wang | G06T 3/4007 |
| 2020/0082614 | A1* | 3/2020 | Xu | G01S 17/89 |
| 2021/0004613 | A1* | 1/2021 | Yang | G06V 10/82 |
| 2021/0012165 | A1* | 1/2021 | Jiang | G06F 16/2465 |
| 2021/0012527 | A1* | 1/2021 | Shu | G06K 9/6274 |
| 2021/0063578 | A1* | 3/2021 | Wekel | G06K 9/6271 |
| 2021/0366202 | A1* | 11/2021 | Xu | G06F 3/147 |

OTHER PUBLICATIONS

Fasano et al., "Multi-sensor data fusion: A tool to enable UAS integration into civil airspace," 2011 IEEE/AIAA 30th Digital Avionics Systems Conference, 2011, pp. 5C3-1-5C3-15, doi: 10.1109/DASC.2011.6096082. (Year: 2011).*

Sengupta et al., "A DNN-LSTM based Target Tracking Approach using mmWave Radar and Camera Sensor Fusion," 2019 IEEE National Aerospace and Electronics Conference (NAECON), 2019, pp. 688-693, doi: 10.1109/NAECON46414.2019.9058168. (Year: 2019).*

Wei et al., "LiDAR and camera detection fusion in a real-time industrial multi-sensor collision avoidance system," Electronics, vol. 7, No. 6, p. 84, May 2018, doi: 10.3390/electronics7060084. (Year: 2018).*

Wang et al., "Multi-sensorfusion in automated driving: A survey." Ieee Access 8 (2019): 2847-2868. (Year: 2019).*

Wang et al., "Integrating millimeter wave radar with a monocular vision sensor for on-road obstacle detection applications." Sensors (Basel). 2011;11(9):8992-9008. doi: 10.3390/s110908992. Epub Sep. 21, 2011. PMID: 22164117; PMCID: PMC3231508. (Year: 2011).*

Gale Bagi et al., "Sensing Structure for Blind Spot Detection System in Vehicles," 2019 International Conference on Control, Automation and Information Sciences (ICCAIS), 2019, pp. 1-6, doi: 10.1109/ICCAIS46528.2019.9074580. (Year: 2019).*

De Silva et al., "Robust fusion of LiDAR and wide-angle camera data for autonomous mobile robots." Sensors 18, No. 8 (2018): 2730. (Year: 2018).*

Liu et al., "Road Segmentation with Image-LiDAR Data Fusion." arXiv preprint arXiv:1905.11559 (2019). (Year: 2019).*

Khan et al., "Towards self-supervised high level sensor fusion." arXiv preprint arXiv:1902.04272 (2019). (Year: 2019).*

Banerjee et al., "Online Camera LiDAR Fusion and Object Detection on Hybrid Data for Autonomous Driving," 2018 IEEE Intelligent Vehicles Symposium (IV), 2018, pp. 1632-1638, doi: 10.1109/IVS.2018.8500699. (Year: 2018).*

Kumar et al., "LiDAR and camera fusion approach for object distance estimation in self-driving vehicles." Symmetry 12, No. 2 (2020): 324. Feb. 24, 2020. (Year: 2020).*

Zhang et al., "Vehicle detection based on LiDAR and camera fusion." In 17th IEEE International Conference on Intelligent Transport Systems (ITSC), Special Session on Advanced Vehicle Active Safety Systems. 2014. (Year: 2014).*

* cited by examiner

METHOD AND APPARATUS FOR ASYNCHRONOUS DATA FUSION, STORAGE MEDIUM AND ELECTRONIC DEVICE

TECHNICAL FIELD

The present disclosure relates to the technical field of asynchronous data fusion, and in particular to a method and an apparatus for asynchronous data fusion, a storage medium and an electronic device.

BACKGROUND

Multi-sensor fusion technology refers to a method for fusing data from different sensors after the data is made to be synchronous. The technology has been widely used in multiple robot applications, such as autonomous driving, Advanced Driver Assistance Systems (ADAS), smart home, surgical robots, and industrial control. Kalman filtering is mostly adopted in conventional multi-sensor fusion technology. In recent years, with the rise of deep learning technology, artificial neural network is increasingly used in multi-sensor data fusion for its strong recognizing ability. The artificial neural network, trained on a large data set, can learn correlations between pieces of data from different sensors and eliminate interference from non-target information.

Multi-sensor fusion technology plays a pivotal role in the application of autonomous driving. Due to the characteristics of high complexity and safety criticality of the autonomous driving, multiple sensors (such as cameras, LiDARs, and radars) and multi-sensor fusion technology are widely used in an autonomous driving perception system. Each of different sensors has advantages and disadvantages. Camera data provided by a camera has a high information density and has color information. However, the camera data has a low dynamic range, it is difficult for the camera to capture sufficient visual information in low-light and high-contrast light conditions. A three-dimensional point cloud generated by a Light Detection and Ranging (LiDAR) can provide accurate three-dimensional information. However, the point cloud is sparse, and spurious points are easily formed in scenarios such as fog, raindrops, snowflakes, and vehicle exhaust. Radar has a long effective range and has an ability to detect speed of objects. However, reliability of radar detection is reduced in scenarios such as tunnels and bridges due to sparse information and multi-path effect and Doppler ambiguity. Different sensors have different characteristics, and failure modes of different sensors are orthogonal to each other. Therefore, redundancy can be increased by using and fusing data from multiple sensors in autonomous driving, thereby improving robustness and reliability of the system.

Fusion of LiDAR and camera is one of the main directions for multi-sensor fusion in autonomous driving. At present, it is actively explored in academia and industry how to fuse inputted LiDAR point cloud and camera images by using an artificial neural network to perform tasks such as object detection and object segmentation. In this way, a LiDAR point cloud of a current frame and a camera image of the current frame are fused, that is, the data from the LiDAR and the data from the camera are fused synchronously. In the synchronous data fusion of LiDAR and camera, laser data and camera data collected at the same frame are fused. Since time stamps of the data collected by the two types of sensors are close to each other, it is convenient to perform fusion directly. However, in a practical autonomous driving engineering application, a mechanical LiDAR has a low sensor latency since streaming can be performed. Moreover, the mechanical LiDAR has a low processing latency since the mechanical LiDAR has a small amount of data (for example, 100 k to 150 k points for a typical 64 beam LiDAR). Compared with the LiDAR, camera has a high sensor latency since it is required to perform image preprocessing (such as encoding/decoding, and color correction) and it is hard to perform streaming. Moreover, the camera has a high processing latency since the camera has a large amount of data (for example, 2000 k pixels for a 1080p image). If the synchronous data fusion is directly performed on the LiDAR and the camera, the overall fusion module will have a high latency. Specifically, data collection and processing at the LiDAR have been completed, fusion algorithm cannot be performed since data collection and processing at the camera are still not completed, which is contrary to rapid response and safety criticality of the autonomous driving system. Therefore, synchronous data fusion of the LiDAR and the camera is not an optimal design in actual autonomous driving engineering.

In actual engineering, another mode of data fusion of LiDAR and camera is widely adopted, that is, radar data of a current frame and camera image of a previous frame are fused asynchronously. It is unnecessary to wait for the processing on the current frame performed by the camera, the radar data of the current frame is fused with processed (or to be processed) camera data of the previous frame, thus the latency of the overall fusion algorithm is reduced in a case that the latency of data collection and processing at the camera is unchanged. In this way, the problem can be well avoided that the overall fusion algorithm has a high latency due to the high latency of data collection and processing of camera images. However, this mode has a poor fusion effect due to data mismatch which is caused by an asynchronous problem, that is, the time stamps of the data collected by the two types of sensors are far away from each other (an interval between the time stamps is more than 100 ms). This mode is currently adopted in some conventional multi-sensor fusion, such as multi-sensor fusion based on Kalman filtering, and the current asynchronous data fusion has a poor fusion result due to data mismatch.

SUMMARY

In order to solve the above problems, a method and an apparatus for asynchronous data fusion, a storage medium and an electronic device are provided according to the embodiments of the present disclosure.

In a first aspect, a method for asynchronous data fusion is provided according to an embodiment of the present disclosure. The method includes:

obtaining current frame LiDAR data, and determining current frame LiDAR three-dimensional embeddings of the current frame LiDAR data;

determining a previous frame fused hidden state, and performing a temporal fusion process based on the previous frame fused hidden state and the current frame LiDAR three-dimensional embeddings to generate a current frame temporary hidden state and a current frame output result, where the previous frame fused hidden state is generated based on a previous frame temporary hidden state and previous frame camera three-dimensional embeddings; and obtaining current frame camera data, determining current frame camera three-dimensional embeddings of the current frame camera data, and generating a current frame fused hidden state based on the current frame camera three-dimensional embeddings and the current frame temporary hidden state, where the current frame fused hidden state is used for a process of performing a temporal fusion process based on the current frame fused hidden state and next frame LiDAR three-dimensional embeddings to generate a next frame temporary hidden state.

According to the present disclosure, a temporal fusion net has at least one hidden layer, and the hidden state is an output of the at least one hidden layer.

In a possible embodiment, the performing a temporal fusion process based on the previous frame fused hidden state and the current frame LiDAR three-dimensional embeddings to generate a current frame temporary hidden state and a current frame output result includes:

constructing a temporal fusion net based on a recurrent neural network;

generating the current frame temporary hidden state and current frame temporal fused embeddings by using the previous frame fused hidden state and the current frame LiDAR three-dimensional embeddings as inputs of the temporal fusion net; and generating the current frame output result based on the current frame temporal fused embeddings.

In a possible embodiment, the determining current frame camera three-dimensional embeddings of the current frame camera data includes:

generating current frame camera two-dimensional embeddings of the current frame camera data based on a preset backbone network; and performing a depth completion process on the current frame camera data based on the current frame LiDAR data to determine pixel depth information of the current frame camera data, and generating the current frame camera three-dimensional embeddings based on the pixel depth information and the current frame camera two-dimensional embeddings.

In a possible embodiment, the performing a depth completion process on the current frame camera data based on the current frame LiDAR data to determine pixel depth information of the current frame camera data, and generating the current frame camera three-dimensional embeddings based on the pixel depth information and the current frame camera two-dimensional embeddings includes:

projecting LiDAR points in the current frame LiDAR data into an image plane of the current frame camera data, using pixel points in the image plane which are matched with the LiDAR points as anchor points, and using depth information of the LiDAR points, which are matched with the anchor points, as depth information of the anchor points;

performing depth completion on pixel points in the image plane, which are not matched with the LiDAR points, based on the depth information of the anchor points to determine depth information of all the pixel points; and projecting the current frame camera two-dimensional embeddings into a three-dimensional space based on the depth information of all the pixel points and camera parameters, to generate the current frame camera three-dimensional embeddings.

In a possible embodiment, the generating a current frame fused hidden state based on the current frame camera three-dimensional embeddings and the current frame temporary hidden state includes:

presetting a sensor fusion net;

performing a concatenation process on the current frame camera three-dimensional embeddings and the current frame temporary hidden state by using the sensor fusion net, to generate the current frame fused hidden state; or performing a pre-fusion process, a mid-fusion process, or a post-fusion process on the current frame camera three-dimensional embeddings and the current frame temporary hidden state by using the sensor fusion net, to generate the current frame fused hidden state.

In a second aspect, an apparatus for asynchronous data fusion is provided according to an embodiment of the present disclosure. The apparatus includes a LiDAR data processing module, a temporal fusion processing module and a camera data processing module.

The LiDAR data processing module is configured to obtain current frame LiDAR data, and determine current frame LiDAR three-dimensional embeddings of the current frame LiDAR data.

The temporal fusion processing module is configured to determine a previous frame fused hidden state, and perform a temporal fusion process based on the previous frame fused hidden state and the current frame LiDAR three-dimensional embeddings to generate a current frame temporary hidden state and a current frame output result. The previous frame fused hidden state is generated based on a previous frame temporary hidden state and previous frame camera three-dimensional embeddings.

The camera data processing module is configured to obtain current frame camera data, determine current frame camera three-dimensional embeddings of the current frame camera data, and generate a current frame fused hidden state based on the current frame camera three-dimensional embeddings and the current frame temporary hidden state. The current frame fused hidden state is used for a process of performing a temporal fusion process based on the current frame fused hidden state and next frame LiDAR three-dimensional embeddings to generate a next frame temporary hidden state.

In a possible embodiment, the temporal fusion processing module performing a temporal fusion process based on the previous frame fused hidden state and the current frame LiDAR three-dimensional embeddings to generate a current frame temporary hidden state and a current frame output result includes:

constructing a temporal fusion net based on a recurrent neural network;

generating the current frame temporary hidden state and current frame temporal fused embeddings by using the previous frame fused hidden state and the current frame LiDAR three-dimensional embeddings as inputs of the temporal fusion net; and generating the current frame output result based on the current frame temporal fused embeddings.

In a possible embodiment, the camera data processing module determining current frame camera three-dimensional embeddings of the current frame camera data includes:

generating current frame camera two-dimensional embeddings of the current frame camera data based on a preset backbone network; and performing a depth completion process on the current frame camera data based on the current frame LiDAR data to determine pixel depth information of the current frame camera data, and generating the current frame camera three-dimensional embeddings based on the pixel depth information and the current frame camera two-dimensional embeddings.

In a third aspect, a computer storage medium is provided according to an embodiment of the present disclosure. The computer storage medium stores computer executable instructions. The computer executable instructions are used for performing the method for asynchronous data fusion according to any one of the above embodiments.

In a fourth aspect, an electronic device is provided according to an embodiment of the present disclosure. The electronic device includes at least one processor and a memory in communication with the at least one processor. The memory stores instructions executable by the at least one processor. The instructions, when executed by the at least one processor, cause the at least one processor to perform the method for asynchronous data fusion according to any one of the above embodiments.

In the method provided in the first aspect according to the embodiments of the present disclosure, the fused hidden state may be generated at each frame, thus the previous frame fused hidden state may be directly obtained at the current frame. The previous frame fused hidden state is correlated with the previous frame camera data and the previous frame LiDAR data. The current frame output result can be generated based on the current frame LiDAR data quickly obtained at the current frame and the previous frame fused hidden state. After the current frame camera data is obtained, the current frame fused hidden state is generated for processing at next frame. By using the method, asynchronous fusion is performed on the current frame LiDAR data and the previous frame camera data, which leads to a low processing latency and a fast speed. Moreover, the temporal fusion process is performed based on the previous frame LiDAR data in the asynchronous fusion at the current frame. Therefore, fusion can be performed better at the current frame, thereby leading to a good fusion effect and solving the problem of poor fusion effect due to data mismatch.

In addition, in the technical solution of the present disclosure, other radars outputting three-dimensional points, such as millimeter wave radars, may be used to replace the LiDAR, as long as the other radars can output enough points to generate a point cloud. Alternatively, other radars outputting three-dimensional points, such as the millimeter wave radars, may be used to supplement the LiDAR to generate a point cloud.

In order to make the objectives, features, and advantages of the present disclosure more comprehensible, preferred embodiments are described below in detail with reference to the drawings as follows.

BRIEF DESCRIPTION OF THE DRAWINGS

The drawings to be used in the description of the embodiments or the conventional technology are described briefly as follows, so that the technical solutions according to the embodiments of the present disclosure or according to the conventional technology become clearer. It is apparent that the drawings in the following description only illustrate some embodiments of the present disclosure. For those skilled in the art, other drawings may be obtained according to these drawings without any creative work.

DETAILED DESCRIPTION OF THE EMBODIMENTS

In the description of the present disclosure, the terms "first" and "second" are used for descriptive purposes only, and should not be understood as indicating or implying relative importance or implicitly indicating the number of indicated technical features. Therefore, the features defined as "first" and "second" may explicitly or implicitly include one or more of the features. In the description of the present disclosure, the meaning of "multiple" is two or more, unless specifically defined otherwise. Hereinafter, embodiments of the present disclosure are specifically described by using a LiDAR and a camera as examples. It should be noted that the present disclosure is not limited to this, and other radars having equivalent or similar functions may be used, as long as the technical solutions of the present disclosure can be implemented.

Figure 1:
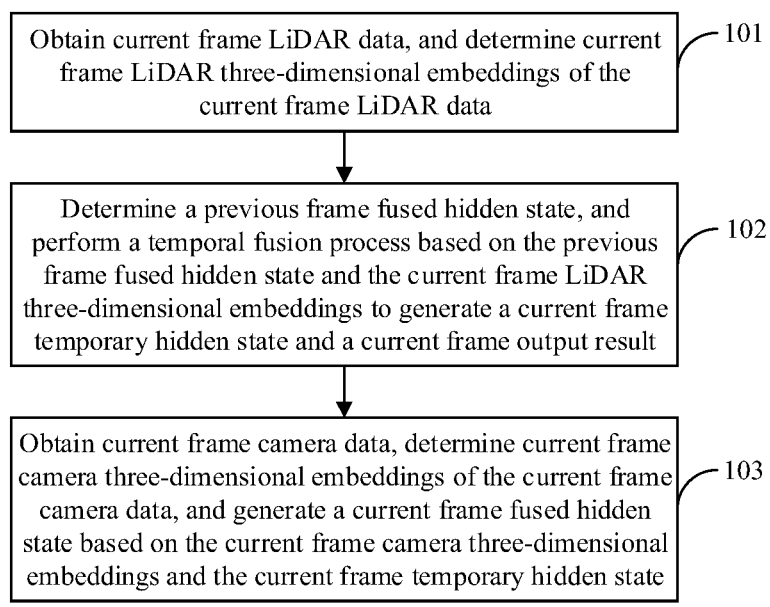
FIG. 1 is a flow chart of a method for asynchronous data fusion according to an embodiment of the present disclosure.

As shown in FIG. 1, a method for asynchronous data fusion is provided according to an embodiment of the present disclosure, the method includes following steps 101 to 103.

In step 101, current frame LiDAR data is obtained, and current frame LiDAR three-dimensional embeddings of the current frame LiDAR data are determined.

In the embodiment of the present disclosure, a LiDAR and a camera are provided in a current scene. For example, in an autonomous driving scene, a LiDAR and a camera are provided on an unmanned vehicle. The LiDAR and the camera collect data in real time, and the collected data is processed in units of frames in the embodiment. Specifically, at a current moment, the LiDAR may collect LiDAR Point data of the current frame, that is, current frame LiDAR data; and the camera may collect an image of the current frame, that is, current frame camera data. However, it takes a period of time to obtain the current frame camera data after obtaining the current frame LiDAR data since the LiDAR has a lower latency.

In the embodiment, after obtaining the current frame LiDAR data, a feature extraction process may be performed on the current frame LiDAR data to determine LiDAR three-dimensional embeddings in the current scene, that is, current frame LiDAR three-dimensional embeddings. A LiDAR net may be preset, and the current frame LiDAR data is processed by using the LiDAR net to obtain the corresponding current frame LiDAR three-dimensional embeddings. Specifically, a voxelization-based algorithm, such as Voxelnet and pointpillar, or a point-based algorithm, such as point RCNN (Regions with CNN features), may be used.

In step 102, a previous frame fused hidden state is determined, and a temporal fusion process is performed based on the previous frame fused hidden state and the current frame LiDAR three-dimensional embeddings to generate a current frame temporary hidden state and a current frame output result. The previous frame fused hidden state is generated based on a previous frame temporary hidden state and previous frame camera three-dimensional embeddings.

In the embodiment of the present disclosure, a fused hidden state may be generated at each frame. A previous frame fused hidden state may be generated at a previous frame of the current frame, and a current frame fused hidden state may be generated at the current frame. At the moment corresponding to each frame, a fused hidden state is generated based on a temporary hidden state and camera three-dimensional embeddings. That is, the previous frame fused hidden state is generated by fusing a previous frame temporary hidden state and previous frame camera three-dimensional embeddings. The current frame LiDAR data may be quickly obtained at the current frame, and the previous frame fused hidden state may obtained by performing fusion at the previous frame of the current frame, therefore, a fusion process may be quickly performed on the previous frame fused hidden state and the current frame LiDAR three-dimensional embeddings at the current frame, to realize asynchronous fusion. It is not required to obtain current frame camera data at the current frame in the process, thus the process is not affected by a processing latency of the camera.

Temporal fusion is adopted in the asynchronous fusion according to the embodiment, that is, a temporal fusion process is performed based on the previous frame fused hidden state and the current frame LiDAR three-dimensional embeddings, to generate the current frame temporary hidden state. Simultaneously, a current frame output result may be generated based on the temporal fusion process, and the current frame output result may be used as a final result of the current frame. The previous frame fused hidden state is generated based on the previous frame temporary hidden state and the previous frame camera three-dimensional embeddings. The generation of the previous frame temporary hidden state is similar as the generation of the current frame temporary hidden state, that is, the previous frame temporary hidden state is correlated with the previous frame LiDAR three-dimensional embeddings. Therefore, at the current frame, the current frame output result is generated essentially by performing a fusion process on the previous frame LiDAR three-dimensional embeddings, the previous frame camera three-dimensional embeddings, and the current frame LiDAR three-dimensional embeddings, therefore, an asynchronous fusion effect is better.

In a case that the current frame is an initial first frame, the previous frame temporary hidden state and the previous frame camera three-dimensional embeddings do not exist since no previous frame exists. In this case, the previous frame fused hidden state, which is obtained based on the previous frame temporary hidden state and the previous frame camera three-dimensional embeddings, may be set to zero, that is, an initial value of a fused hidden state is zero.

In step 103, current frame camera data is obtained, current frame camera three-dimensional embeddings of the current frame camera data are determined, and a current frame fused hidden state is generated based on the current frame camera three-dimensional embeddings and the current frame temporary hidden state. The current frame fused hidden state is used for a process of performing a temporal fusion process based on the current frame fused hidden state and next frame LiDAR three-dimensional embeddings to generate a next frame temporary hidden state.

In the embodiment of the present disclosure, as described above, the current frame camera data is obtained based on the image of the current frame collected by the camera, and the current frame camera three-dimensional embeddings are determined by performing a feature extraction process on the current frame camera data. Then, a fusion process is performed on the current frame temporary hidden state generated in step 102 and the current frame camera three-dimensional embeddings, to generate a current frame fused hidden state. Similar to the previous frame fused hidden state, the current frame fused hidden state is used for a process of performing a temporal fusion process based on the current frame fused hidden state and next frame LiDAR three-dimensional embeddings to generate a next frame temporary hidden state. That is, the steps 101 to 103 may be performed at each frame to realize cyclic execution, and an output result obtained by performing a temporal fusion process may be generated at each frame.

Optionally, a sensor fusion net may be preset in the embodiment. The current frame camera three-dimensional embeddings and the current frame temporary hidden state are inputted into the sensor fusion net to generate a current frame fused hidden state, to realize the fusion of the current frame camera data and the current frame LiDAR data. A concatenation process may be performed on the current frame camera three-dimensional embeddings and the current frame temporary hidden state by using the sensor fusion net, that is, the current frame camera three-dimensional embeddings and the current frame temporary hidden state are concatenated together, to generate the current frame fused hidden state. Alternatively, a pre-fusion process, a mid-fusion process, or a post-fusion process may be performed on the current frame camera three-dimensional embeddings and the current frame temporary hidden state by using the sensor fusion net, to generate the current frame fused hidden state.

In the method for asynchronous data fusion provided according to the embodiments of the present disclosure, the fused hidden state may be generated at each frame, thus the previous frame fused hidden state may be directly obtained at the current frame. The previous frame fused hidden state is correlated with the previous frame camera data and the previous frame LiDAR data. The current frame output result can be generated based on the current frame LiDAR data quickly obtained at the current frame and the previous frame fused hidden state. After the current frame camera data is obtained, the current frame fused hidden state is generated for processing at next frame. By using the method, asynchronous fusion is performed on the current frame LiDAR data and the previous frame camera data, which leads to a low processing latency and a fast speed. Moreover, the temporal fusion process is performed based on the previous frame LiDAR data in the asynchronous fusion at the current frame. Therefore, fusion can be performed better at the current frame, thereby leading to a good fusion effect and solving the problem of poor fusion effect due to data mismatch.

Based on the above embodiments, the operation of "performing a temporal fusion process based on the previous frame fused hidden state and the current frame LiDAR three-dimensional embeddings to generate a current frame temporary hidden state and a current frame output result" in step 102 includes steps A1 to A3.

In step A1, a temporal fusion net is constructed based on a recurrent neural network.

In step A2, the current frame temporary hidden state and current frame temporal fused embeddings are generated by using the previous frame fused hidden state and the current frame LiDAR three-dimensional embeddings as inputs of the temporal fusion net.

In step A3, the current frame output result is generated based on the current frame temporal fused embeddings.

In the embodiment of the present disclosure, the temporal fusion process is based on a temporal fusion net. The temporal fusion net is constructed based on a recurrent neural network and is specifically used to perform a temporal fusion process on LiDAR three-dimensional embeddings. Specifically, the temporal fusion net may generate and output the current frame temporary hidden state and the current frame temporal fused embeddings by using the previous frame fused hidden state and the current frame LiDAR three-dimensional embeddings as inputs. Then, the current frame temporary fused embeddings may be inputted into a task-related network, such as a detector, and a segmenter, to obtain a final result after data fusion, that is, the current frame output result.

Figure 2:
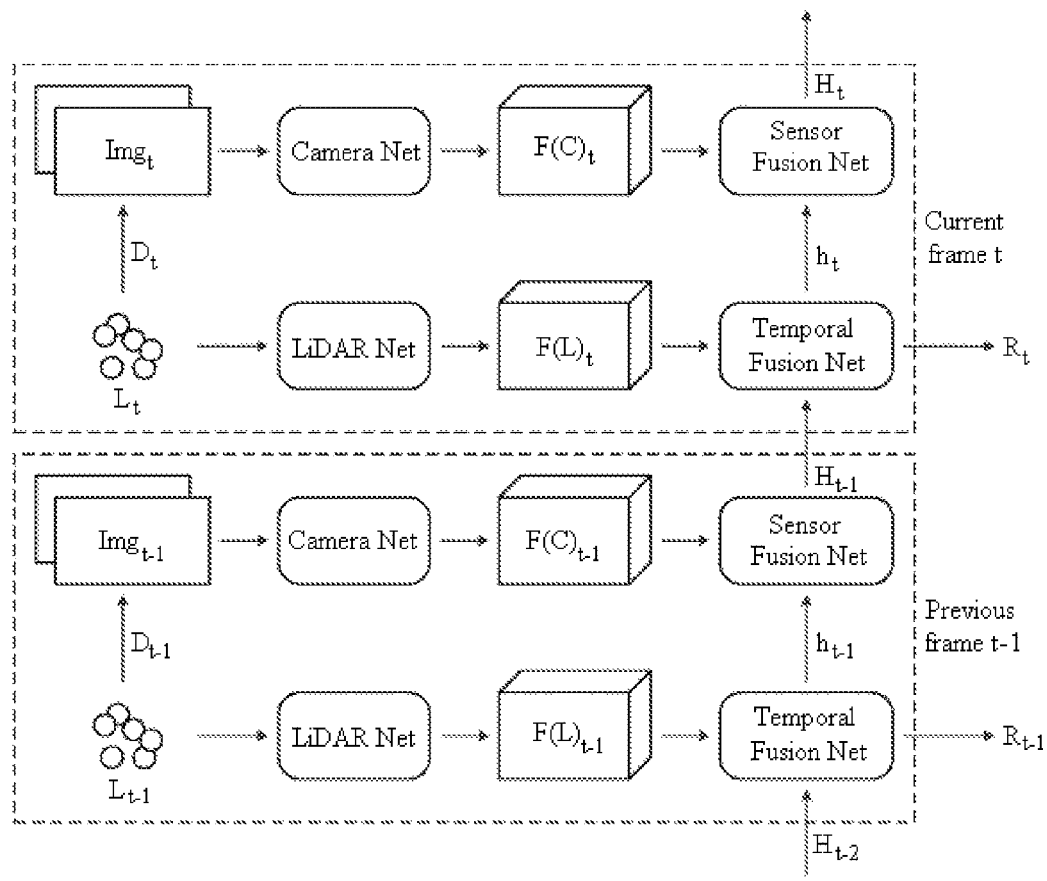
FIG. 2 is a schematic diagram showing a detailed process of a method for asynchronous data fusion according to an embodiment of the present disclosure.

Specifically, reference is made to FIG. 2, which shows a detailed process of the method for asynchronous data fusion. It is assumed that the current frame is frame t and the previous frame is frame t−1. At the current frame t, a fused hidden state of frame t−1, i.e. previous frame fused hidden state may be obtained. At the current frame, current frame LiDAR data $L_t$ may be collected by the LiDAR. Current frame LiDAR three-dimensional embeddings $F(L)_t$ may be generated by inputting current frame LiDAR data $L_t$ into a preset LiDAR net. Then, current frame temporary hidden state $h_t$ and current frame temporal fused embeddings may be obtained by inputting the previous frame fused hidden state $H_{t-1}$ and the current frame LiDAR three-dimensional embeddings $F(L)_t$ into a temporal fusion net. Current frame output result $R_t$ is determined based on the current frame temporal fused embeddings.

Based on the above embodiments, a camera net may be preset. The camera net may process the inputted current frame camera data to obtain current frame three-dimensional data of the current frame camera data. Specifically, the operation of "determining current frame camera three-dimensional embeddings of the current frame camera data" in step 103 includes steps B1 and B2.

In step B1, current frame camera two-dimensional embeddings of the current frame camera data are generated based on a preset backbone network.

In step B2, a depth completion process is performed on the current frame camera data based on the current frame LiDAR data to determine pixel depth information of the current frame camera data, and the current frame camera three-dimensional embeddings are generated based on the pixel depth information and the current frame camera two-dimensional embeddings.

In the embodiment of the present disclosure, the image collected by the camera is generally two-dimensional data without depth, and the LiDAR can collect depth information. Therefore, the depth completion process is adopted in the embodiment to generate spatial three-dimensional embeddings of the camera, that is, the current frame camera three-dimensional embeddings. Specifically, in the embodiment, two-dimensional embeddings of the current frame camera data, i.e. the current frame camera two-dimensional embeddings, are extracted based on a backbone network. The backbone network may specifically be a ResNet, a DenseNet, a MobileNet, and the like. Then, the depth completion process may be performed based on the current frame LiDAR data and the current frame camera two-dimensional embeddings of the current frame camera data.

Specifically, the operation of "performing a depth completion process on the current frame camera data based on the current frame LiDAR data to determine pixel depth information of the current frame camera data, and generating the current frame camera three-dimensional embeddings based on the pixel depth information and the current frame camera two-dimensional embeddings" in step B2 includes steps B21 to B23.

In step B21, LiDAR points in the current frame LiDAR data are projected into an image plane of the current frame camera data, pixel points in the image plane which are matched with the LiDAR points are used as anchor points, and depth information of the LiDAR points, which are matched with the anchor points, is used as depth information of the anchor points.

In step B22, depth completion is performed on pixel points in the image plane, which are not matched with the LiDAR points, based on the depth information of the anchor points to determine depth information of all the pixel points.

In step B23, the current frame camera two-dimensional embeddings are projected into a three-dimensional space based on the depth information of all the pixel points and camera parameters, to generate the current frame camera three-dimensional embeddings.

In the embodiment of the present disclosure, the LiDAR data is point cloud data, it is sparse and cannot completely cover all the pixel points of the image collected by the camera. Therefore, in the embodiment, pixel points which are matched with the LiDAR points are used as anchor points, and depth completion is performed on pixel points which are not matched with the LiDAR points based on the anchor points, to determine depth information of all the pixel points in the image collected by the camera. After the depth completion is performed, the current frame camera two-dimensional embeddings are projected into a three-dimensional space based on the depth information of all the pixel points and camera parameters, to obtain three-dimensional embeddings of the current frame, that is, the current frame camera three-dimensional embeddings. The camera parameters include internal parameters and external parameters. The internal parameters include an internal parameter matrix and a distortion parameter matrix. The external parameters include a rotation matrix and a translation vector.

Process of the method for asynchronous data fusion is described in detail below with reference to FIG. 2. As shown in FIG. 2, the current frame is frame t, and the previous frame is frame t−1.

At frame t, the LiDAR may collect data to generate current frame LiDAR data $L_t$. Current frame LiDAR three-dimensional embeddings $F(L)_t$ may be generated by inputting the current frame LiDAR data $L_t$ into a preset LiDAR net. At frame t−1, a corresponding fused hidden state, i.e. the previous frame fused hidden state $H_{t-1}$, may be generated in advance. Then, at frame t, the previous frame fused hidden state $H_{t-1}$ and the current frame LiDAR three-dimensional embeddings $F(L)_t$ may be directly inputted into the temporal fusion net to obtain current frame temporary hidden state $h_t$ and current frame temporal fused embeddings. Then, current frame output result $R_t$ is determined based on the current frame temporal fused embeddings.

At frame t, the camera may collect an image. Camera data, i.e. the current frame camera data $Img_t$, is generated by processing the image. Depth information $D_t$ is extracted from the current frame LiDAR data $L_t$, then current frame camera three-dimensional embeddings $F(C)_t$ may be generated by inputting the current frame camera data $Img_t$ and the depth information $D_t$ into a camera net. Then, current frame fused hidden state $H_t$ may be obtained by inputting the current frame camera three-dimensional embeddings $F(C)_t$ and the current frame temporary hidden state $h_t$ generated previously into a sensor fusion net. Then, at next frame, that is, at frame t+1, the above steps may be repeatedly performed. Then, a next frame temporary hidden state may be generated by performing a temporal fusion process based on the current frame fused hidden state $H_t$ and next frame LiDAR three-dimensional embeddings.

Generation process of the previous frame fused hidden state $H_{t-1}$ obtained at frame t is the similar as the generation process of the current frame fused hidden state $H_t$. Specifically, referring to FIG. 2, previous frame LiDAR three-dimensional embeddings $F(L)_{t-1}$ is generated based on previous frame LiDAR data $L_{t-1}$ at frame t−1. A pre-previous frame fused hidden state $H_{t-2}$ and previous frame LiDAR three-dimensional embeddings $F(L)_{t-1}$ are fused by using the temporal fusion net, to obtain previous frame temporary hidden state $h_{t-1}$ and previous frame output result $R_{t-1}$. After obtaining previous frame camera data $Img_{t-1}$, previous frame camera three-dimensional embeddings $F(C)_{t-1}$ may be obtained based on depth information $D_{t-1}$ in the previous frame LiDAR data $L_{t-1}$. Then, previous frame fused hidden state $H_{t-1}$ may be obtained by using the sensor fusion net to perform a fusion process on the previous frame camera three-dimensional embeddings $F(C)_{t-1}$ and the previous frame temporary hidden state $h_{t-1}$.

In the method for asynchronous data fusion provided according to the embodiments of the present disclosure, the fused hidden state may be generated at each frame, thus the previous frame fused hidden state may be directly obtained at the current frame. The previous frame fused hidden state is correlated with the previous frame camera data and the previous frame LiDAR data. The current frame output result can be generated based on the current frame LiDAR data quickly obtained at the current frame and the previous frame fused hidden state. After the current frame camera data is obtained, the current frame fused hidden state is generated for processing at next frame. By using the method, asynchronous fusion is performed on the current frame LiDAR data and the previous frame camera data, which leads to a low processing latency and a fast speed. Moreover, the temporal fusion process is performed based on the previous frame LiDAR data in the asynchronous fusion at the current frame. Therefore, fusion can be performed better at the current frame, thereby leading to a good fusion effect and solving the problem of poor fusion effect due to data mismatch.

The process of the method for asynchronous data fusion is described in detail above. The method may be implemented by a corresponding apparatus. The structure and functions of the apparatus are described in detail below.

Figure 3:
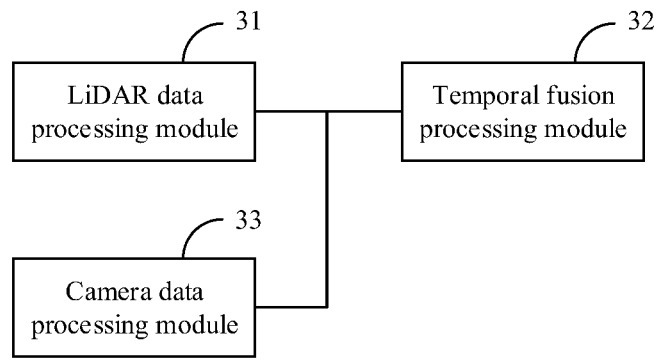
FIG. 3 is a schematic structural diagram of an apparatus for asynchronous data fusion according to an embodiment of the present disclosure.

As shown in FIG. 3, an apparatus for asynchronous data fusion is provided according to an embodiment of the present disclosure. The apparatus includes a LiDAR data processing module 31, a temporal fusion processing module 32, and a camera data processing module 33.

The LiDAR data processing module 31 is configured to obtain current frame LiDAR data, and determine current frame LiDAR three-dimensional embeddings of the current frame LiDAR data.

The temporal fusion processing module 32 is configured to determine a previous frame fused hidden state, and perform a temporal fusion process based on the previous frame fused hidden state and the current frame LiDAR three-dimensional embeddings to generate a current frame temporary hidden state and a current frame output result. The previous frame fused hidden state is generated based on a previous frame temporary hidden state and previous frame camera three-dimensional embeddings.

The camera data processing module 33 is configured to obtain current frame camera data, determine current frame camera three-dimensional embeddings of the current frame camera data, and generate a current frame fused hidden state based on the current frame camera three-dimensional embeddings and the current frame temporary hidden state. The current frame fused hidden state is used for a process of performing a temporal fusion process based on the current frame fused hidden state and next frame LiDAR three-dimensional embeddings to generate a next frame temporary hidden state.

Based on the above embodiments, the temporal fusion processing module 32 performing a temporal fusion process based on the previous frame fused hidden state and the current frame LiDAR three-dimensional embeddings to generate a current frame temporary hidden state and a current frame output result includes:
  constructing a temporal fusion net based on a recurrent neural network;
  generating the current frame temporary hidden state and current frame temporal fused embeddings by using the previous frame fused hidden state and the current frame LiDAR three-dimensional embeddings as inputs of the temporal fusion net; and generating the current frame output result based on the current frame temporal fused embeddings.

Based on the above embodiments, the camera data processing module 33 determining current frame camera three-dimensional embeddings of the current frame camera data includes:
  generating current frame camera two-dimensional embeddings of the current frame camera data based on a preset backbone network; and
  performing a depth completion process on the current frame camera data based on the current frame LiDAR data to determine pixel depth information of the current frame camera data, and generating the current frame camera three-dimensional embeddings based on the pixel depth information and the current frame camera two-dimensional embeddings.

Based on the above embodiments, the camera data processing module 33 performing a depth completion process on the current frame camera data based on the current frame LiDAR data to determine pixel depth information of the current frame camera data, and generating the current frame camera three-dimensional embeddings based on the pixel depth information and the current frame camera two-dimensional embeddings includes:
  projecting LiDAR points in the current frame LiDAR data into an image plane of the current frame camera data, using pixel points in the image plane which are matched with the LiDAR points as anchor points, and using depth information of the LiDAR points, which are matched with the anchor points, as depth information of the anchor points;
  performing depth completion on pixel points in the image plane, which are not matched with the LiDAR points, based on the depth information of the anchor points to determine depth information of all the pixel points; and
  projecting the current frame camera two-dimensional embeddings into a three-dimensional space based on the depth information of all the pixel points and camera parameters, to generate the current frame camera three-dimensional embeddings.

Based on the above embodiments, the camera data processing module 33 generating a current frame fused hidden state based on the current frame camera three-dimensional embeddings and the current frame temporary hidden state includes:

presetting a sensor fusion net;

performing a concatenation process on the current frame camera three-dimensional embeddings and the current frame temporary hidden state by using the sensor fusion net, to generate the current frame fused hidden state; or performing a pre-fusion process, a mid-fusion process, or a post-fusion process on the current frame camera three-dimensional embeddings and the current frame temporary hidden state by using the sensor fusion net, to generate the current frame fused hidden state.

In the apparatus for asynchronous data fusion provided according to the embodiments of the present disclosure, the fused hidden state may be generated at each frame, thus the previous frame fused hidden state may be directly obtained at the current frame. The previous frame fused hidden state is correlated with the previous frame camera data and the previous frame LiDAR data. The current frame output result can be generated based on the current frame LiDAR data quickly obtained at the current frame and the previous frame fused hidden state. After the current frame camera data is obtained, the current frame fused hidden state is generated for processing at next frame. In this way, asynchronous fusion is performed on the current frame LiDAR data and the previous frame camera data, which leads to a low processing latency and a fast speed. Moreover, the temporal fusion process is performed based on the previous frame LiDAR data in the asynchronous fusion at the current frame. Therefore, fusion can be performed better at the current frame, thereby leading to a good fusion effect and solving the problem of poor fusion effect due to data mismatch.

A computer storage medium is provided according to an embodiment of the present disclosure. The computer storage medium stores computer executable instructions. The computer executable instructions include programs for performing the method for asynchronous data fusion. The computer executable instructions may be used for performing the method according to any one of the above method embodiments.

The computer storage medium may be any available medium or data storage device that can be accessed by a computer, including but not limited to magnetic storage (such as a floppy disk, hard disk, magnetic tape, and magneto-optical disk (MO)), optical storage (such as CD, DVD, BD, and HVD), and semiconductor memory (such as ROM, EPROM, EEPROM, non-volatile memory (NAND FLASH), and solid state drive (SSD)).

Figure 4:
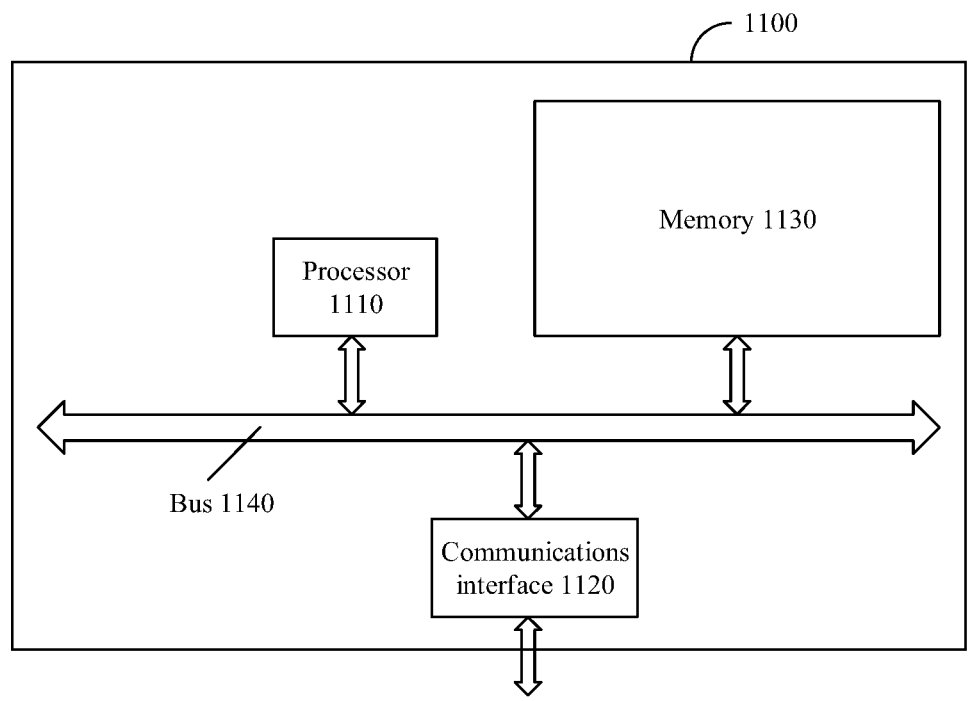
FIG. 4 is a schematic structural diagram of an electronic device for performing a method for asynchronous data fusion according to an embodiment of the present disclosure.

FIG. 4 shows a structural block diagram of an electronic device according to an embodiment of the present disclosure. The electronic device 1100 may be any device with computing capabilities, such as a host server, a personal computer (PC), a tablet computer, a vehicle-mounted computer, or a portable computer or terminal. The specific embodiments of the present disclosure do not limit the specific implementation of the electronic device.

The electronic device 1100 includes at least one processor 1110, a communications interface 1120, a memory 1130, and a bus 1140. The processor 1110, the communications interface 1120, and the memory 1130 communicate with each other via the bus 1140.

The communications interface 1120 is configured to communicate with a network element. The network element includes, for example, a virtual machine management center, and a shared storage.

The processor 1110 is configured to execute a program. The processor 1110 may be configured as a central processing unit (CPU), or an application specific integrated circuit (ASIC), or one or more integrated circuits for implementing the embodiments of the present disclosure.

The memory 1130 is configured to store executable instructions. The memory 1130 may include a high-speed RAM memory, and may also include a non-volatile memory, for example, at least one disk memory. The memory 1130 may be a memory array. The memory 1130 may be divided into blocks, and the blocks may be combined into a virtual volume according to a certain rule. The instructions stored in the memory 1130 can be executed by the processor 1110 to cause the processor 1110 to perform the method for asynchronous data fusion according to any one of the above method embodiments.

The above are only preferred embodiments of the present disclosure, however, the protection scope of the present disclosure is not limited to this. Those skilled in the art, within the technical solutions of the present disclosure, can make many possible variations and replacements to the technical solutions of the present disclosure. These variations and replacements should fall into the protection scope of the present disclosure. Therefore, the protection scope of the present disclosure shall be defined by the protection scope of the claims.

The invention claimed is:

1. A method for asynchronous data fusion, comprising:
obtaining current frame LiDAR data, and determining current frame LiDAR three-dimensional embeddings of the current frame LiDAR data;
determining a previous frame fused hidden state, and performing a temporal fusion process based on the previous frame fused hidden state and the current frame LiDAR three-dimensional embeddings to generate a current frame temporary hidden state and a current frame output result, wherein the previous frame fused hidden state is generated based on a previous frame temporary hidden state and previous frame camera three-dimensional embeddings; and
obtaining current frame camera data, determining current frame camera three-dimensional embeddings of the current frame camera data, and generating a current frame fused hidden state based on the current frame camera three-dimensional embeddings and the current frame temporary hidden state, wherein the current frame fused hidden state is used for a process of performing a temporal fusion process based on the current frame fused hidden state and next frame LiDAR three-dimensional embeddings to generate a next frame temporary hidden state.

2. The method according to claim 1, wherein the performing a temporal fusion process based on the previous frame fused hidden state and the current frame LiDAR three-dimensional embeddings to generate a current frame temporary hidden state and a current frame output result comprises:
constructing a temporal fusion net based on a recurrent neural network;
generating the current frame temporary hidden state and current frame temporal fused embeddings by using the previous frame fused hidden state and the current frame LiDAR three-dimensional embeddings as inputs of the temporal fusion net; and
generating the current frame output result based on the current frame temporal fused embeddings.

3. The method according to claim 1, wherein the determining current frame camera three-dimensional embeddings of the current frame camera data comprises:

generating current frame camera two-dimensional embeddings of the current frame camera data based on a preset backbone network; and performing a depth completion process on the current frame camera data based on the current frame LiDAR data to determine pixel depth information of the current frame camera data, and generating the current frame camera three-dimensional embeddings based on the pixel depth information and the current frame camera two-dimensional embeddings.

4. The method according to claim 3, wherein the performing a depth completion process on the current frame camera data based on the current frame LiDAR data to determine pixel depth information of the current frame camera data, and generating the current frame camera three-dimensional embeddings based on the pixel depth information and the current frame camera two-dimensional embeddings comprises:

projecting LiDAR points in the current frame LiDAR data into an image plane of the current frame camera data, using pixel points in the image plane which are matched with the LiDAR points as anchor points, and using depth information of the LiDAR points, which are matched with the anchor points, as depth information of the anchor points;

performing depth completion on pixel points in the image plane, which are not matched with the LiDAR points, based on the depth information of the anchor points to determine depth information of all the pixel points; and projecting the current frame camera two-dimensional embeddings into a three-dimensional space based on the depth information of all the pixel points and camera parameters, to generate the current frame camera three-dimensional embeddings.

5. The method according to claim 1, wherein the generating a current frame fused hidden state based on the current frame camera three-dimensional embeddings and the current frame temporary hidden state comprises:

presetting a sensor fusion net;

performing a concatenation process on the current frame camera three-dimensional embeddings and the current frame temporary hidden state by using the sensor fusion net, to generate the current frame fused hidden state; or performing a pre-fusion process, a mid-fusion process, or a post-fusion process on the current frame camera three-dimensional embeddings and the current frame temporary hidden state by using the sensor fusion net, to generate the current frame fused hidden state.

6. The method according to claim 1, wherein the LiDAR is replaced by other radars outputting three-dimensional points, and the other radars outputting three-dimensional points are capable of outputting enough points to generate a point cloud.

7. The method according to claim 1, wherein the LiDAR is supplemented by other radars outputting three-dimensional points to generate a point cloud.

8. An apparatus for asynchronous data fusion, comprising:

a LiDAR data processing module, configured to obtain current frame LiDAR data, and determine current frame LiDAR three-dimensional embeddings of the current frame LiDAR data;

a temporal fusion processing module, configured to determine a previous frame fused hidden state, and perform a temporal fusion process based on the previous frame fused hidden state and the current frame LiDAR three-dimensional embeddings to generate a current frame temporary hidden state and a current frame output result, wherein the previous frame fused hidden state is generated based on a previous frame temporary hidden state and previous frame camera three-dimensional embeddings; and a camera data processing module, configured to obtain current frame camera data, determine current frame camera three-dimensional embeddings of the current frame camera data, and generate a current frame fused hidden state based on the current frame camera three-dimensional embeddings and the current frame temporary hidden state, wherein the current frame fused hidden state is used for a process of performing a temporal fusion process based on the current frame fused hidden state and next frame LiDAR three-dimensional embeddings to generate a next frame temporary hidden state.

9. The apparatus according to claim 8, wherein the temporal fusion processing module performing a temporal fusion process based on the previous frame fused hidden state and the current frame LiDAR three-dimensional embeddings to generate a current frame temporary hidden state and a current frame output result comprises:

constructing a temporal fusion net based on a recurrent neural network;

generating the current frame temporary hidden state and current frame temporal fused embeddings by using the previous frame fused hidden state and the current frame LiDAR three-dimensional embeddings as inputs of the temporal fusion net; and generating the current frame output result based on the current frame temporal fused embeddings.

10. The apparatus according to claim 8, wherein the camera data processing module determining current frame camera three-dimensional embeddings of the current frame camera data comprises:

generating current frame camera two-dimensional embeddings of the current frame camera data based on a preset backbone network; and performing a depth completion process on the current frame camera data based on the current frame LiDAR data to determine pixel depth information of the current frame camera data, and generating the current frame camera three-dimensional embeddings based on the pixel depth information and the current frame camera two-dimensional embeddings.

11. A non-transitory computer storage medium storing computer executable instructions, wherein the computer program is used to, when being executed by a processor, perform:

obtaining current frame LiDAR data, and determining current frame LiDAR three-dimensional embeddings of the current frame LiDAR data;

determining a previous frame fused hidden state, and performing a temporal fusion process based on the previous frame fused hidden state and the current frame LiDAR three-dimensional embeddings to generate a current frame temporary hidden state and a current frame output result, wherein the previous frame fused hidden state is generated based on a previous frame temporary hidden state and previous frame camera three-dimensional embeddings; and obtaining current frame camera data, determining current frame camera three-dimensional embeddings of the current frame camera data, and generating a current frame fused hidden state based on the current frame camera three-dimensional embeddings and the current frame temporary hidden state, wherein the current frame fused hidden state is used for a process of performing a temporal fusion process based on the current frame fused hidden state and next frame LiDAR three-dimensional embeddings to generate a next frame temporary hidden state.

* * * * *